Figure 3:
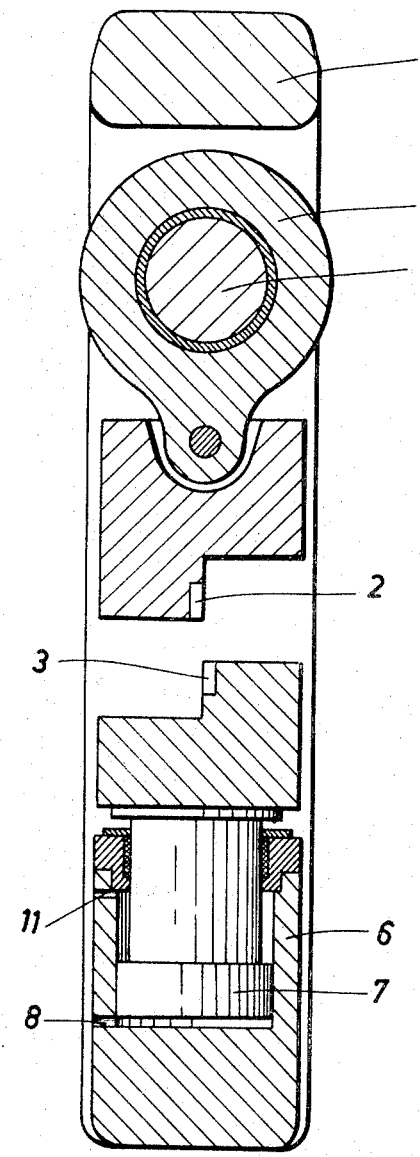

United States Patent
Scherb et al.

[11] 3,745,867
[45] July 17, 1973

[54] SHEARING MACHINE

[75] Inventors: Gustav Scherb, Linz; Norbert Auer, Traun, both of Austria

[73] Assignee: Vereinigte Osterreichische Eisen-und Stahlwerke Aktiengesellschaft, Linz, Austria

[22] Filed: July 23, 1971

[21] Appl. No.: 165,454

[30] Foreign Application Priority Data
Aug. 4, 1970 Austria..................A 7056/70

[52] U.S. Cl................. 83/554, 83/8, 83/563, 83/568, 83/602, 83/639, 83/590
[51] Int. Cl.................................. B26d 5/08
[58] Field of Search.................. 83/554, 563, 568, 83/602, 628, 590, 8, 9, 527, 530, 248, 639

[56] References Cited
UNITED STATES PATENTS
3,453,914  7/1969  Lemper et al. ................ 83/8
3,298,267  1/1967  Schmid et al. ................ 83/530

Primary Examiner—Andrew R. Juhasz
Assistant Examiner—W. D. Bray
Attorney—Kurt Kelman

[57] ABSTRACT

A drive cutter blade and a backing cutter blade are mounted in a frame and relatively movable toward and away from each other to cut through a workpiece disposed between them. An eccentric drive mechanism is connected to said driven cutter blade and operable to perform alternating cutting strokes in the direction from said driven cutter blade toward said backing cutter blade and return strokes in the direction from said backing cutter blade toward said driven cutter blade. Said cutter blades are adapted to be spaced apart a distance which exceeds the extent of one of said strokes. One of said cutter blades is a follow-up cutter blade. Follow-up drive means are connected to said follow-up cutter blade and adapted to impart to said follow-up cutter blade a follow-up movement toward the other cutter blade during each of said return strokes. Said follow-up drive means comprise a hydraulic actuator connected to said follow-up cutter blade, a hydraulic supply conduit connected to said actuator and adapted to supply liquid under pressure thereto in the direction of said follow-up movement, a shut-off valve incorporated in said conduit, and means for closing said shut-off valve during said working strokes to block the supply of liquid to said actuator and for opening said shut-off valve during said return strokes to permit of a supply of liquid to said actuator A workpiece having a thickness exceeding the extent of one of said strokes can thus be cut through in a plurality of cutting strokes and both said cutter blades remain in contact with said workpiece during said return strokes.

6 Claims, 4 Drawing Figures

FIG.1
FIG.2
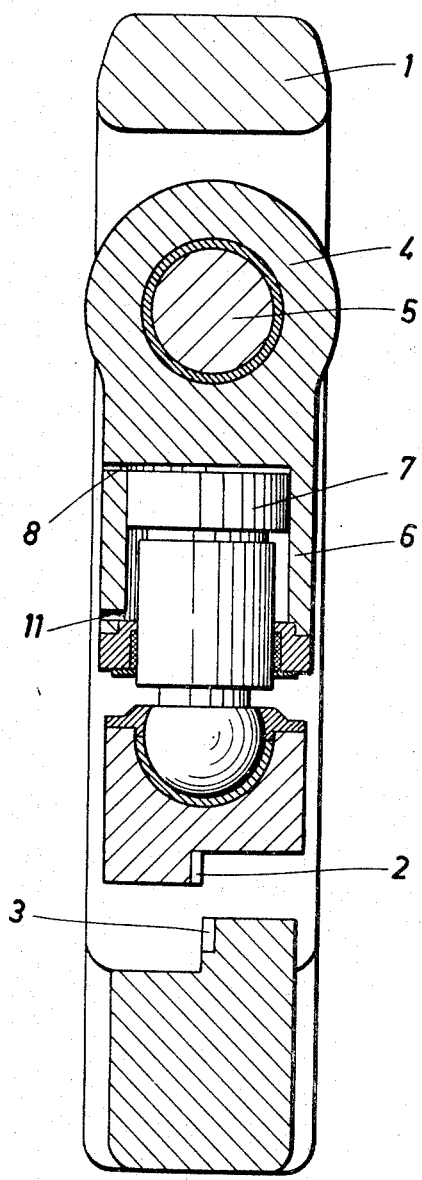
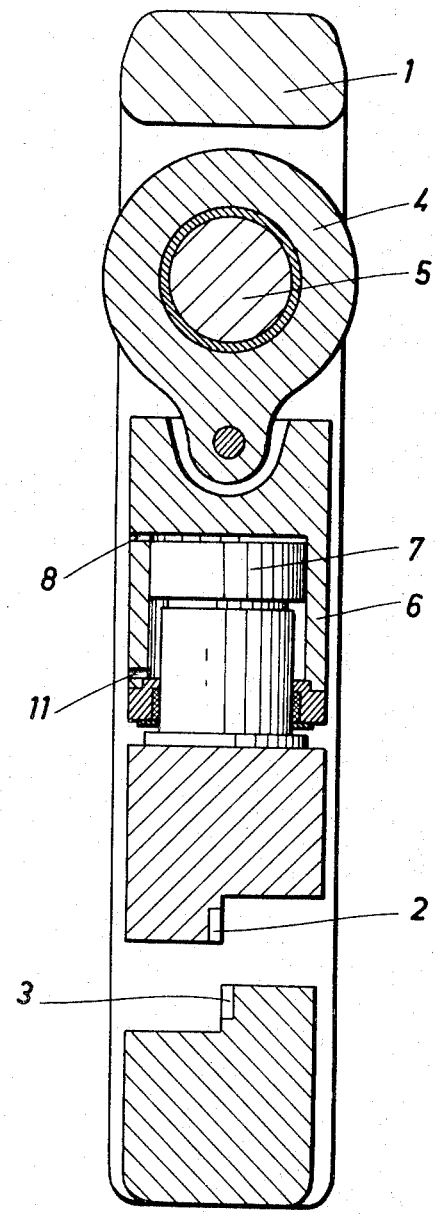

SHEARING MACHINE

This invention relates to a shearing machine for cutting through thick metallic workpieces, such as ingots, slabs, billets or the like, in a plurality of closely succeeding cutting strokes, which machine comprises two cutter blades, which are mounted in a frame and one of which is movable by means of a crank drive toward the other cutter blade, which is stationary at least during the cutting strokes, said one cutter blade performing cutting strokes and return strokes in alternation, and one of the cutter blades being displaceable during the return strokes by a follow-up drive toward the other cutter blade by a distance which corresponds to the stroke.

In order to avoid as far as possible a deformation of the workpiece during the cut, such shears use a small or zero cutting angle. Owing to this small cutting angle, large cutting forces are required. When it is desired to cut through the workpiece in a single stroke, mechanical shears driven by a crank drive must exert a high driving torque, depending on the thickness of the workpiece. This involves the need for a drive means having large dimensions.

Shearing machines have already been disclosed in which the cutter blades are driven by a crank drive and in which the driving torque requirement is reduced in that said cutter blades cut through the workpiece in a plurality of closely succeeding strokes rather than in a single cutting stroke. A follow-up movement is imparted to one of the two cutter blades by a screw during the return stroke in such a manner that both cutter blades constantly engage the workpiece. Hence, one cutter blade is advanced during the return stroke toward the other cutter blade to the extent of the return stroke so that the next shear cut is effected during the next working stroke of the crank. That known stepwise follow-up movement of the cutter blades has various drawbacks. A separate drive motor is required to rotate the screw, and this motor must be very strong to overcome the frictional forces between the screw and the nut moving thereon and to move all heavy masses, such as the cutter blades, the cutter blade holder, etc. On the other hand, the drive must be sufficiently strong to retract the cutter blades when the machine is jammed. Because the screw itself is a rigid connecting element and cannot yield in the case of trouble to protect the shears from damage, particularly near the dead center positions of the crank motion, a separate low-strength member or the like must be provided to prevent such damage.

It is an object of the invention to eliminate these disadvantages and to provide a shearing machine which enables a follow-up movement of one of the two cutter blades with simple means and with a low power requirement whereas the risk of damage to the machine when it is jammed is eliminated.

In a shearing machine of the kind defined first hereinbefore, the above object is accomplished by the invention essentially in that the additional drive consists of a hydraulic actuator, which is provided with a hydraulic supply conduit incorporating a shut-off valve which is adapted to be operated in synchronism with the cycles of the cutter blades to shut off said conduit. During the return stroke of the crank drive, the shut-off valve opens the hydraulic supply conduit to supply the cylinder of the actuator so that additional liquid under pressure can enter the cylinder and the cutter blade connected to the actuator is advanced toward the other cutter blade and thus remains in engagement with the workpiece. During the cutting stroke, the shut-off valve is closed. The hydraulic actuator serves as a rigid connector and the next cut is effected.

If, in accordance with the invention, pressue is applied to both ends of the actuator to retract the cutter blade, the cutter blade connected to the actuator can be returned in a simple manner to its starting position for a new cut.

To enable a taking up of any forces which might damage the shearing machine, it is a further feature of the invention to connect the cylinder of the actuator to an adjustable pressure relief valve, which will open when the pressure applied to the actuator exceeds the pressure to which the valve has been set. Pressure fluid can now escape from the cylinder and the piston is displaced in the cylinder until the pressure has been reduced to the value to which the pressure relief valve has been set.

Figure 4:
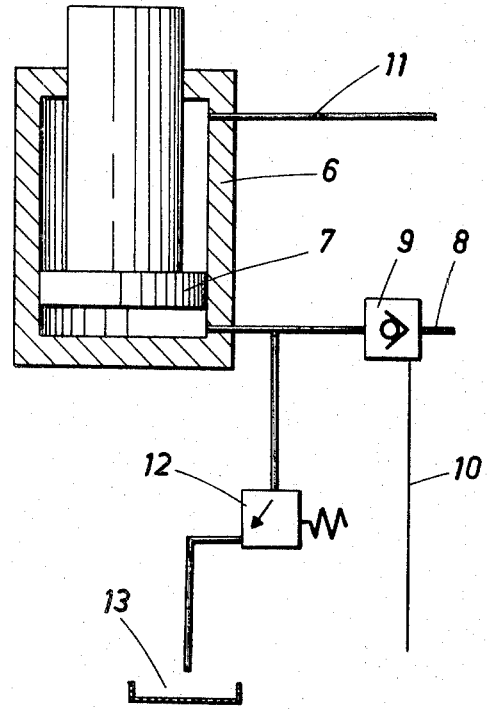

A plurality of embodiments of the invention are shown by way of example in the drawings, in which FIGS. 1, 2, and 3 are diagrammatic longitudinal sectional views showing respective embodiments of shearing machines according to the invention, and FIG. 4 is a diagrammatic representation of the hydraulic system for controlling the actuator.

Two cutter blades 2 and 3 are mounted in a frame 1. The cutter blade 2 is driven by a crank drive consisting of a connecting rod 4 and an eccentric shaft 5. In FIGS. 1 and 2, the cutter blade and in FIG. 3 the cutter blade 3 is connected to a hydraulic actuator. In FIGS. 1 and 2, that actuator is connected between the crank drive and the cutter blade 2, and the cutter blade 3 is firmly mounted in the frame 1. In FIG. 3, the cutter blade 3 is moved by the actuator, which bears on the frame 1. The cylinder 6 of the actuator may be formed by the connecting rod 4 itself, as is shown in FIG. 1, or may be pivoted to the connecting rod 4, as is shown in FIG. 2. If the cylinder 6 is formed by the connecting rod 4, the piston rod of the piston 7 must be mounted in a ball-and-socket joint in the holder for the cutter blade 2.

The cylinder 6 is connected to a hydraulic supply conduit 8, which can be shut off by a shut-off valve 9. The shut-off valve 9 can be controlled by means of a pilot conduit 10 in synchronism with the strokes of the crank drive 4, 5 to open and close the supply conduit 8. Another hydraulic conduit 11 is connected to the cylinder 6 on the other side of the piston 7, and liquid under pressure can be pumped into the cylinder 6 when the shut-off valve 9 is open. A pressure relief valve 12 is connected to the conduit 8 between the cylinder 6 and the shut-off valve 9, and a conduit leads from the pressure relief valve 12 to a pressure fluid reservoir 13.

When the crank drive performs a cutting stroke, the shut-off valve incorporated in the supply conduit 8 is closed and the actuator piston 7 is held in position. The driving force of the crank drive is then directly transmitted to the cutter blade 2. When the crank drive reaches its dead center position, a limit switch, not shown, is operated to cause the shut-off valve 9 to open so that the supply pump can supply liquid to the piston 7 of the actuator as long as the pressure to which the pressure relief valve 12 has been set is not exceeded. The cutter blade which has been connected to the hydraulic actuator is now advanced toward the other cutter blade so that both cutter blades remain in contact with the workpiece. When the crank drive reaches its other dead center position, another limit switch is operated to cause the shut-off valve 9 to close so that another cutting stroke can be performed. In the case of trouble, e.g., when a cutter blade remains stuck in the workpiece, the shearing machine will not be damaged because the pressure relief valve 12 opens automatically when the set maximum upper pressure limit is exceeded and the piston in the cylinder of the actuator can then yield. Because liquid pressure can be applied to the other end of the hydraulic piston through the conduit 11, the cutter blade can be withdrawn out of the workpiece in the case of a failure of the main drive. The possibility to apply pressure to both ends of the piston 7 of the actuator enables a movement of the piston in both directions. This is also desirable for the restoring of the actuator to its initial position for a new cut.

We claim:

1. In a shearing machine which comprises a frame, a driven cutter blade and a backing cutter blade mounted in the frame and defining a gap therebetween for receiving a workpiece to be severed, an eccentric drive mechanism connected to the driven cutter blade and operable to perform alternating cutting and return strokes, the driven cutter blade being moved incrementally into the gap during each of the cutting strokes toward the backing cutter blade to cut the workpiece, the backing cutter blade being arranged to be held stationary relative to the frame during the cutting strokes, and a follow-up drive means connected to one of the cutter blades to impart to the one cutter blade a follow-up movement in respect of the other cutter blade during each of the return strokes and corresponding substantially to the extent of the return stroke to keep the gap between the cutter blades substantially unchanged during the return strokes, the improvement of the follow-up drive means comprising 1. hydraulic actuator connected to the one cutter blade,
2. a hydraulic supply conduit connected to the actuator and arranged to supply hydraulic fluid under pressure thereto for operating the actuator to move the one cutter blade in the direction of the follow-up movement,
3. a shut-off valve mounted in the hydraulic supply conduit, and
4. means for closing the shut-off valve during the cutting strokes to block the supply of hydraulic fluid to the actuator and for opening the shut-off valve during the return strokes to supply the fluid to the actuator for operating the same.

2. In the shearing machine of claim 1, a second hydraulic supply conduit connected to the actuator and arranged to supply hydraulic fluid under pressure thereto for operating the actuator to move the one cutter blade in a direction opposite to that of the follow-up movement whereby the one cutter blade is retracted from the other cutter blade.

3. In the shearing machine of claim 1, an adjustable pressure relief valve arranged in the hydraulic supply conduit between the actuator and the shut-off valve.

4. In the shearing machine of claim 1, the one cutter blade being the driven cutter blade and the hydraulic actuator being mounted between the eccentric drive mechanism and the driven cutter blade, the actuator connecting the drive mechanism to the driven cutter blade.

5. In the shearing machine of claim 1, the one cutter blade being the backing cutter blade.

6. In a machine for applying pressure to a workpiece, which comprises a frame, a driven pressure-applying member and a backing pressure-applying member mounted in the frame and defining a gap therebetween for receiving the workpiece, an eccentric drive mechanism connected to the driven pressure-applying member and operable to perform alternating pressure-applying working strokes and return strokes, the driven pressure-applying member being moved incrementally into the gap during each of the working strokes toward the backing pressure-applying member, the backing pressure-applying member being arranged to be held stationary relative to the frame during the working strokes, and a follow-up drive means connected to one of the pressure-applying member to impart to the one pressure-applying member a follow-up movement in respect of the other pressure-applying member during each of the return strokes and corresponding substantially to the extent of the return stroke to keep the gap between the pressure-applying members substantially unchanged during the return strokes, the improvement of the follow-up drive means comprising 1. a hydraulic actuator connected to the one pressure-applying member,
2. a hydraulic supply conduit connected to the actuator and arranged to supply hydraulic fluid under pressure thereto for operating the actuator to move the one pressure-applying member in the direction of the follow-up movement,
3. a shut-off valve mounted in the hydraulic supply conduit, and
4. means for closing the shut-off valve during the working strokes to block the supply of hydraulic fluid to the actuator and for opening the shut-off valve during the return strokes to supply the fluid to the actuator for operating the same.

* * * * *